United States Patent [19]

Polesnak

[11] Patent Number: 4,829,449

[45] Date of Patent: May 9, 1989

[54] METHOD AND APPARATUS FOR MEASURING AND PROVIDING CORRECTED GAS FLOW

[75] Inventors: David L. Polesnak, Monroeville

[73] Assignee: Rockwell International Corporation, Pittsburgh, Pa.

[21] Appl. No.: 826,332

[22] Filed: Feb. 5, 1986

[51] Int. Cl.$^4$ .................... G06F 15/36; G01N 11/00
[52] U.S. Cl. .................. 364/510; 73/861.03; 324/63; 324/74; 364/571.02
[58] Field of Search .............. 73/861.03; 364/571, 364/510; 324/63

[56] References Cited

U.S. PATENT DOCUMENTS

| | | |
|---|---|---|
| 2,859,619 | 11/1958 | Fellows . |
| 3,176,514 | 4/1965 | Foster . |
| 3,226,574 | 12/1965 | Winkler . |
| 3,425,274 | 2/1969 | Clement et al. . |
| 3,535,560 | 10/1970 | Cliff . |
| 3,537,312 | 11/1970 | Moore . |
| 3,566,685 | 3/1971 | Zimmerman et al. . |
| 3,614,892 | 10/1971 | Ottenstein . |
| 3,617,713 | 11/1971 | Karkson . |
| 3,666,928 | 5/1972 | Burke et al. . |
| 3,699,320 | 10/1972 | Zimmerman et al. . |
| 3,701,280 | 10/1972 | Stroman . |
| 3,729,995 | 5/1973 | Kovacs et al. . |
| 3,739,159 | 6/1973 | Nalley . |
| 3,752,393 | 8/1973 | Moseley . |
| 3,783,248 | 1/1974 | Sugden, Jr. . |
| 3,802,261 | 4/1974 | Zimmerman et al. . |
| 3,822,377 | 7/1974 | Beck . |
| 3,823,310 | 7/1974 | Kalotay et al. . |
| 3,831,011 | 8/1974 | Hulme . |
| 3,854,038 | 12/1974 | McKinley . |
| 3,895,529 | 7/1975 | Moore . |
| 4,005,603 | 2/1977 | Golahny et al. . |
| 4,031,362 | 6/1977 | Brugger et al. . |
| 4,056,717 | 11/1977 | Cornforth . |
| 4,061,030 | 12/1977 | Griverus . |
| 4,093,871 | 6/1978 | Plumb et al. . |
| 4,101,056 | 7/1978 | Mattimoe et al. . |
| 4,138,608 | 2/1979 | Brugger et al. . |
| 4,149,254 | 4/1979 | Molusis . |
| 4,156,129 | 5/1979 | Brugger et al. . |
| 4,173,891 | 11/1979 | Johnson . |
| 4,238,825 | 12/1980 | Geery . |
| 4,337,655 | 7/1982 | Sundstrom et al. . |
| 4,355,365 | 10/1982 | McCracken et al. . |
| 4,390,956 | 6/1983 | Cornforth et al. . |
| 4,404,638 | 9/1983 | Yada et al. . |
| 4,419,898 | 12/1983 | Zanker et al. . |
| 4,584,868 | 4/1986 | Jacobsen et al. .................. 73/861.03 |

Primary Examiner—Thomas H. Tarcza
Assistant Examiner—David Cain
Attorney, Agent, or Firm—Richard A. Speer; R. Lewis Gable

[57] ABSTRACT

A method and apparatus is disclosed for measuring flowing gas and at least one variable for calculating gas flow corrected to a base value of that variable. Illustratively, the measured variables are temperature and pressure, and devices are employed for measuring the temperature $T_f$ and pressure $P_f$ of the gas flowing through a conduit, and means in the illustrative form of a flow meter for measuring the volume $V_f$ of the gas flowing through the conduit. Calculating means in the illustrative form of a programmed microprocessor is employed to calculate the corrected gas volume to base conditions in accordance with an expression including the supercompressibility factor. The supercompressibility factor is calculated according to an equation involving only whole number exponentiation and a selected set of coefficients. The calculation means selects a particular set of these coefficients in accordance with indications of pressure and/or temperature.

7 Claims, 9 Drawing Sheets

| REGION | A | B | C | D | E | F | G | H | I |
|---|---|---|---|---|---|---|---|---|---|
| 1 | .99524 | 2.2220 | -.18959-7 | -.17055-4 | .60098-11 | 1.3657-2 | .37911-5 | -.17758-8 | -264.85 |
| 2 | .98522 | 4.1776 | -.35115-7 | .12872-4 | .77676-11 | .81204-2 | .68239-5 | -.21256-8 | -286.10 |
| 3 | .90016 | 14.360 | -.26649-6 | .25806-3 | .79750-10 | -2.1139-2 | .34730-4 | -.10831-7 | -311.30 |
| 4 | .98655 | 2.3493 | -.13520-7 | .44319-4 | -.16803-10 | .51225-2 | .30124-5 | .17173-8 | -100.34 |
| 5 | .98559 | 1.7041 | .66302-8 | .74557-4 | -.29712-10 | .29752-2 | .16134-5 | .26277-8 | -49.913 |
| 6 | .98636 | 1.0484 | .25304-7 | .10516-3 | -.24682-10 | .14772-2 | .69866-6 | .24057-8 | -19.659 |
| 7 | .94556 | 4.6941 | .37778-7 | .11971-3 | -.52230-10 | -.22575-2 | .44315-5 | .16851-8 | -68.159 |
| 8 | .95019 | 6.0221 | -.22860-7 | .10371-3 | -.23948-10 | -.14645-2 | .73780-5 | -.29261-9 | -143.88 |
| 9 | .57783 | 40.700 | -.10158-5 | .11118-2 | .30369-9 | -9.2563-2 | .96552-4 | -.28961-7 | -245.82 |
| 10 | .72358 | 32.798 | -.80926-6 | .79168-3 | .27829-9 | -7.7801-2 | .87267-4 | -.21985-7 | -189.96 |
| 11 | .99788 | .34994 | -.54032-7 | .48062-4 | .18721-9 | .41318-2 | .52096-5 | -.12064-7 | -11.641 |

COEFFICIENT

NUMBER FORMAT: .48062-4 MEANS .48062 × 10⁻⁴

METHOD AND APPARATUS FOR MEASURING AND PROVIDING CORRECTED GAS FLOW

BACKGROUND OF THE INVENTION

1. Field of the Invention:

This invention relates to systems and methods for measuring gas flow, flow temperature and flow pressure and for determining with a high degree of accuracy the supercompressibility factor, from which a value of gas volume at base conditions of temperature and pressure may be calculated.

2. Description of the Prior Art:

Gas is compressible, the volume of which changes as a function of temperature and pressure in accordance with the well known ideal gas laws. Natural gas is widely used as a fuel and, typically, is transmitted via pipelines from a source to an end user. Conditions of temperature and pressure may vary widely throughout such a gas distribution system. To distribute and sell gas that is exposed to varying conditions of temperature and pressure, calculations must be made to convert the measured flow or line volume $V_f$ of gas, in terms of cubic feet at varying flow or line conditions of flow or line temperature $T_f$ and pressure $P_f$, to a standard cubic feet volume $V_b$ at specified, previously agreed upon base temperature $T_b$ and base pressure $P_b$.

The basic gas law relationship can be expressed as:

$$PV = NRTZ \tag{1}$$

where:
P is absolute pressure
V is volume
N is moles of gas
R is the universal gas constant
T is the absolute temperature
Z is the compressibility factor.

When dealing with a simple gas, such as $N_2$ or $O_2$, the ideal gas laws serve very well, and Z may not be needed. However, when there are mixtures of gases and complex hydrocarbons, it has been found that Boyle's and Charles' laws are in error. Fuel gases tend to be easier to compress, up to around 2000 psig, than these laws would suggest. Above this pressure, the trend is reversed. The exact values are functions of the pressure, temperature and the gas composition. The ideal gas law is extended to the real conditions by the use of the compressibility factor z.

From equation (1), the following relationship between base and flowing conditions may be derived:

$$V_b = V_f \frac{P_f + P_a}{P_b} \frac{T_b}{T_f} (F_{pv})^2, \tag{2}$$

where:
$V_b$ is base volume
$V_f$ is flowing volume
$P_f$ is flowing pressure, gage
$P_a$ is atmospheric pressure
$P_b$ is base pressure, absolute
$T_b$ is base temperature, absolute
$T_f$ is flowing temperature, absolute
$F_{pv}$ is supercompressibility factor The difficult part of calculating base volume in accordance with equation (2) is to determine the supercompressibility factor $F_{pv}$ which is a function of the flowing temperature and pressure, as well as the specific gravity and the composition of the gas being measured.

One way of determining the supercompressibility factor $F_{pv}$ is to utilize the equations and tables as those set forth in the "Manual for the Determination of Supercompressibility Factors for Natural Gas", PAR Research Projects NX-19, published by the American Gas Association (AGA). The supercompressibility factor $F_{pv}$ is complex to calculate, as will be seen below, since it is a function of five variables: pressure, temperature, specific gravity of the gas and the composition of the gas, in terms of mol % of the constituent gases such as nitrogen and carbon dioxide. The AGA NX-19 method for determining the supercompressibility factor $F_{pv}$ is as follows:

$$F_{pv} = \sqrt{\frac{\frac{B}{D} - D + \frac{n}{3\pi}}{1 + \frac{.00132}{\tau^{3.25}}}} \tag{3}$$

$$K_T = M_c + 1.681 M_n, \tag{4}$$

where
$M_c$ is mol % of $CO_2$ and
$M_n$ is mol % of N.

$$F_T = \frac{226.29}{(99.15 + 211.9\, G - K_T)}, \tag{5}$$

where G is specific gravity $$\tau = \frac{t_{adj} + 460}{500}, \tag{6}$$

where $t_{adj} = [(t+460)F_T] - 460$ and t is gas temperature, °F.

$$K_p = M_c - 0.392 M_n \tag{7}$$

$$F_p = \frac{156.47}{(160.8 - 7.22\, G + K_p)} \tag{8}$$

$$\pi = \frac{P_{adj} + 14.7}{1000}, \tag{9}$$

where $P_{adj} = P \cdot F_P$ and P is gas pressure, psig $$m = .0330378\, (\tau)^{-2} - 0.0221323\, (\tau)^{-3} + 0.0161353\, (\tau)^{-5} \tag{10}$$

$$n = \frac{0.265827\, (\tau)^{-2} + 0.0457697\, (\tau)^{-4} - 0.133185\, (\tau)^{-1}}{m} \tag{11}$$

$$B = \frac{3 - mn^2}{9\, m\, \pi^2} \tag{12}$$

$$b = \frac{9n - 2\, m\, n^3}{54\, m\, \pi^3} - \frac{E}{2\, m\, \pi^2} \tag{13}$$

$$D = [b + \sqrt{b^2 + B^3}\,]^{\frac{1}{3}} \tag{14}$$

The value of E is calculated based upon one of a number of equations, the particular equation being selected for a particular range of adjusted pressure and adjusted temperature. For example, $E_2$ is calculated according to the following equation for an adjusted pressure range of 0 to 1300 psia and an adjusted temperature rate of $-40°$ F. to $+85°$ F.:

$$E_2 = 1. -0.00075(\pi)^{2.3}[2.0 - e^{-20(1.09-\tau)}] - 1.317(1.09 - \tau)^4(\pi)(1.69 - \pi^2) \quad (15)$$

U.S. Pat. No. 4,173,891 of Johnson, assigned to the assignee of this invention, discloses a gas flow measuring and calculating system for measuring values of line pressure, temperature and gas flow and for providing corrected indications of gas flow at base conditions of temperature and pressure. The Johnson system employs calculation means in the form of a microprocessor utilizing the ideal gas laws and calculates the supercompressibility factor $F_{pv}$ in accordance with equations (3) to (15) as set out above. These calculations comprise a number of commuting steps, each step using an initially approximated value of the supercompressibility factor or the previously-calculated value. The Johnson system calculates these supercompressibility factors exactly, but at the expense of employing a lengthy and time consuming program to execute.

U.S. Pat. No. 4,390,956 of Cornforth et al. discloses a system employing the following simplified expression for the supercompressiblity factor $F_{pv}$:

$$F_{pv} - 1 = (P_f/QT_f) \quad (16),$$

where $$Q = \frac{P_f}{(F_{pv} - 1) T_f} \quad (17)$$

By considering only values of the supercompressibility factor $F_{pv}$ for a limited range of flow temperature $T_f$, a linear fit of Q may be made as a function of $T_f$. In particular, two fits or linear equations are required as a function of $T_f$ permitting Q to be expressed as follows:

$$Q = S + CT_f \quad (18),$$

where C and S may be expressed as linear equations as a function of the flow pressure $T_f$. Cornforth et al. states that the use of their simplified equations (16) to (18), as expressed above, produces calculations of the corrected volume with an accuracy to within plus or minus 0.1%. Thus, the prior art is left on the horns of a dilemma having either to program the lengthy equations of the AGA NX-19 set or to use less complex equations that fit or approximate the values of supercompressibility with an appreciable sacrifice in accuracy. As the cost of natural gas has risen, the commercial necessity of accurately measuring and calculating gas flow to a set of base conditions, becomes more important.

The prior art, as exemplified by U.S. Pat. Nos. 4,056,717 of Cornforth et al. and 4,093,871 of Plumb et al., have further recognized the problem of employing a gas flow measuring and correcting circuit at remote locations, where power lines are not readily available, thus normally requiring the use of batteries as the energization source. If batteries are used, the energized circuitry needs to be designed to minimize power requirements or, otherwise, frequent battery replacement may be necessary, which would be, at least, inconvenient where the measuring and correcting circuitry is employed at remote locations. The Plumb et al. patent '871 discloses a measuring and correction circuit, which includes a first, relatively high power consuming portion and a second, relatively low power consuming portion. To minimize battery drainage, the battery is selectively connected for limited periods of time to the first portion. The Plumb et al. circuit employs a reed switch coupled to a gas flow meter to open and close, thus producing a train of pulses dependent upon the uncorrected gas flow. Each of these pulses not only indicates a unit volume of uncorrected fluid flow, but also serves to apply the battery for a limited period of time to the first portion, while the battery is continuously connected to the second portion.

The use of batteries to energize such measuring and correcting circuits not only raises problems of battery drainage, but also problems of achieving accurate measurement of temperature and pressure as a result of the varying voltage levels produced by batteries due to fluctuations of ambient conditions, namely temperature, and to extended use. To some degree, complex and expensive voltage regulating circuits could be employed to ensure the supply of a substantially constant voltage level to such measuring and correcting circuits; however, such accurate voltage regulators are expensive and do not of themselves compensate for voltage fluctuations as would be applied to the temperature and pressure measuring elements. Such pressure and temperature elements may be resistive in nature and, thus, produce fluctuations in voltage thereacross; thus, such resistive devices output signals that not only vary as a function of pressure and temperature, but also as a function of the voltage supply level.

SUMMARY OF THE INVENTION

It is therefore an object of this invention to provide a new and improved system for measuring and correcting measurements of flow volume as a function of pressure and temperature of the flow gas.

It is a more particular object of this invention to achieve a calculation of the gas supercompressibility factor to an accuracy within 0.06%, over applicable temperature and pressure ranges, of the results obtained by the AGA NX-19 method.

It is a still further object of this invention to provide a new and improved system for measuring a corrected gas flow employing a processor for executing a simplified, shortened program.

It is a further object of this invention to provide a new and improved measuring and correcting system employing a processor executing a simplified, shortened program avoiding calculations using fractional exponentiation.

It is still another object of this invention to provide a new and improved system for measuring and correcting gas flow that avoids the problems of the prior art associated with fluctuating voltage levels as would otherwise affect the accuracy with which pressure and temperature are measured.

It is a still further object of this invention to provide a new and improved method of deriving measurements of variables such as temperature and pressure that avoids or negates the effects of varying voltage levels.

It is a further object of this invention to provide a new and improved system employing variable measuring elements, whose output signals are dependent upon voltage levels, in a circuit that compensates for varying levels of voltage to provide accurate indications of the measured variables.

In accordance with these and other objects, this invention is related to a method and apparatus for measuring flowing gas and at least one variable for calculating gas flow corrected to a base value of that variable. Illustratively, the measured variables are temperature and pressure, and devices are employed for measuring the temperature $T_f$ and $P_f$ of the gas flowing through a conduit, and means in the illustrative form of a flow meter for measuring the volume $V_f$ of the gas flowing through the conduit. Calculating means in the illustrative form of a microprocessor is employed to calculate the corrected gas volume to base conditions in accordance with an expression including the supercompressibility factor. The supercompressibility factor is calculated according to an equation involving only whole number exponentiation and a selected set of coefficients. The calculation means selects a particular set of these coefficients in accordance with indications of pressure and/or temperature.

A second aspect of this invention involves a method of taking measurements of variables with element(s) whose impedance varies as a function of the measured variable, and of a voltage derived from a fluctuating supply source, e.g. a battery. A calibration process is used, whereby the variable measuring element is exposed to a first calibration temperature, and first and second signals are derived from the variable measuring element and a reference element. The variable measuring element is also exposed to a second, higher calibration variable, and corresponding third and fourth signals are derived from the variable measuring element and the reference element. First and second calibration ratios are then as the ratios of the first and second, and third and fourth signals. Subsequently, the variable measuring element is exposed to a present, unknown variable, and corresponding fifth and sixth signals are similarly derived to provide a present ratio of the fifth to sixth signals. The present ratio is interpolated with respect to the first and second calibration ratios to provide a manifestation or signal indicative of the measured variable, which is substantially free of any fluctuation of the level of voltage applied thereto.

In a still further aspect of this invention, there is disclosed a system for minimizing current drain in a battery energized system, comprising a first volatile memory energized by the battery at a first, relatively low power consumption rate, for storing a set of calculation variables, and a second, non-volatile memory energizable by the battery at a second, relatively high power consumption rate, for storing a back-up set of the calibration variables. A control mechanism in the form of a programmed microprocessor reviews the set of calculation variables stored in the first, volatile memory and, if any portion of the set is not correctly retained, the non-volatile memory is energized and the back-up set of calibration variables is transferred to the first, volatile memory.

BRIEF DESCRIPTION OF THE DRAWINGS

A detailed description of the preferred embodiment of this invention is hereafter made with specific reference to the drawings, in which.

DETAILED DESCRIPTION OF THE PREFERRED EMBODIMENT

Figure 1:
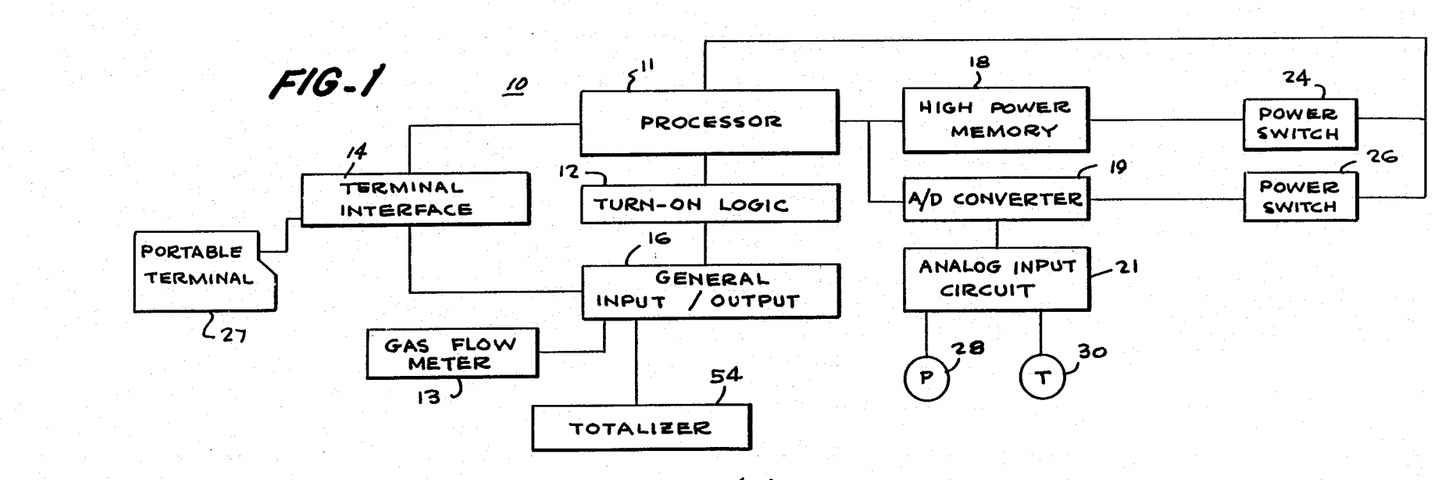
FIG. 1 is a functional block diagram of the apparatus or system for measuring and correcting gas flow as a function of measured temperature and pressure in accordance with the teachings of this invention.

Referring now to the drawings and in particular to FIG. 1, a corrected gas flow measuring system is indicated by the general numeral 10. In a preferred embodiment of this invention, this system 10 is implemented by a programmed microprocessor 11 for receiving and processing a series of pulses generated by a gas flow meter 13 coupled to a gas conduit or line, each meter pulse indicative of a unit volume of the gas flow through the line. The receipt of each meter pulse by the programmed microprocessor 11 provides an uncorrected indication of the gas unit volume of gas flow through the line for the present measurements of the flow pressure $P_f$ within the line, as taken by a pressure measuring device 28, and of the flow temperature $T_f$ of the gas within the line, as measured by a temperature measuring device 30. As will be explained, the application of each meter pulse to the microprocessor 11 initiates the calculation in accordance with a simplified algorithm or equation to correct the measured gas flow to base conditions of pressure $P_b$ and temperature $T_b$. The resultant calculations are outputted by a general input/output 16 to a totalizer 54. The gas flow meter 13 is coupled to a general input/output 16, whereby the series of meter pulses is applied via the input/output 16 and a turn-on logic circuit 12 to the microprocessor 11. Resultant calculations of corrected volume for this line volume increment, are outputted through the general input/output 16 to a totalizer 54, which accumulates corrected volume.

The corrected gas flow measuring system 10 is battery powered so that it may be used in remote locations, where normal AC power is not available. To reduce battery drainage, each pulse of the gas flow meter 13 is applied to a turn-on logic circuit 12 to initiate the operation of the microprocessor 11, the sampling of the outputs of the pressure and temperature measuring devices 28 and 30 and the calculation of corrected gas volume at base conditions. The samples of flow temperature $T_f$ and flow pressure $P_f$ are taken by an analog input circuit 21 and are converted from analog to digital values by an analog-to-digital (A/D) converter 19.

Further, the calculation of the supercompressibility factor $F_{pv}$ requires the storage and availability of a set of calculation variables including specific gravity G, $M_c$ and $M_n$, indicative of the mol %'s of carbon dioxide and nitrogen, i.e., the illustrative constituents of the natural gas measured by this system 10, and a plurality of sets of coefficients to be entered into the simplified equation or algorithm used for the calculation of the supercompressibility factor $F_{pv}$. In accordance with the teachings of this invention, there are a plurality of sets of coefficients, each set corresponding to particular range of measured pressure and temperature. These coefficients and calculation variables are stored within a low power memory 34, as shown in FIG. 2B and included generally within the block of the microprocessor 11 as shown in FIG. 1. A backup set of the calculation variables is also stored in a high power, non-volatile memory 18, in case they are lost from the low power memory 34. Lightning or accidental discharge of static electricity in the vicinity of the corrected gas flow measuring system 10, can possibly effect data loss from the low power memory 34. In the course of performing a calculation, the microprocessor 11 performs an error check of these constants and coefficients within the low power memory 34 and, if there is an error, a power switch 24 is closed to energize the high power, non-volatile memory 18 and to effect a dump of these constants and coefficients into the low power memory 34. After the memory dump, the power switch 24 is opened, thus reducing battery drainage. In a similar fashion, a power switch 26 is closed to energize the A/D converter 19 for a relatively brief period sufficient to permit the A/D conversion of the sampled line temperature and line pressure measurements. The A/D converter 19 is a relatively high power consuming device and its brief energization extends the battery life.

As illustrated in FIG. 1, the pressure measuring and temperature measuring devices 28 and 30 are coupled to an analog input circuit 21, which in turn is coupled to the A/D converter 19. Further, the system 10 employs a real time clock 38 shown in FIG. 2B, whereby an array or histogram of daily or hourly measurements of pressure, temperature and gas volume may be stored in the low power memory 34 and, upon interrogation, may be read through the terminal interface 14 to the portable terminal 27.

Figure 2A:
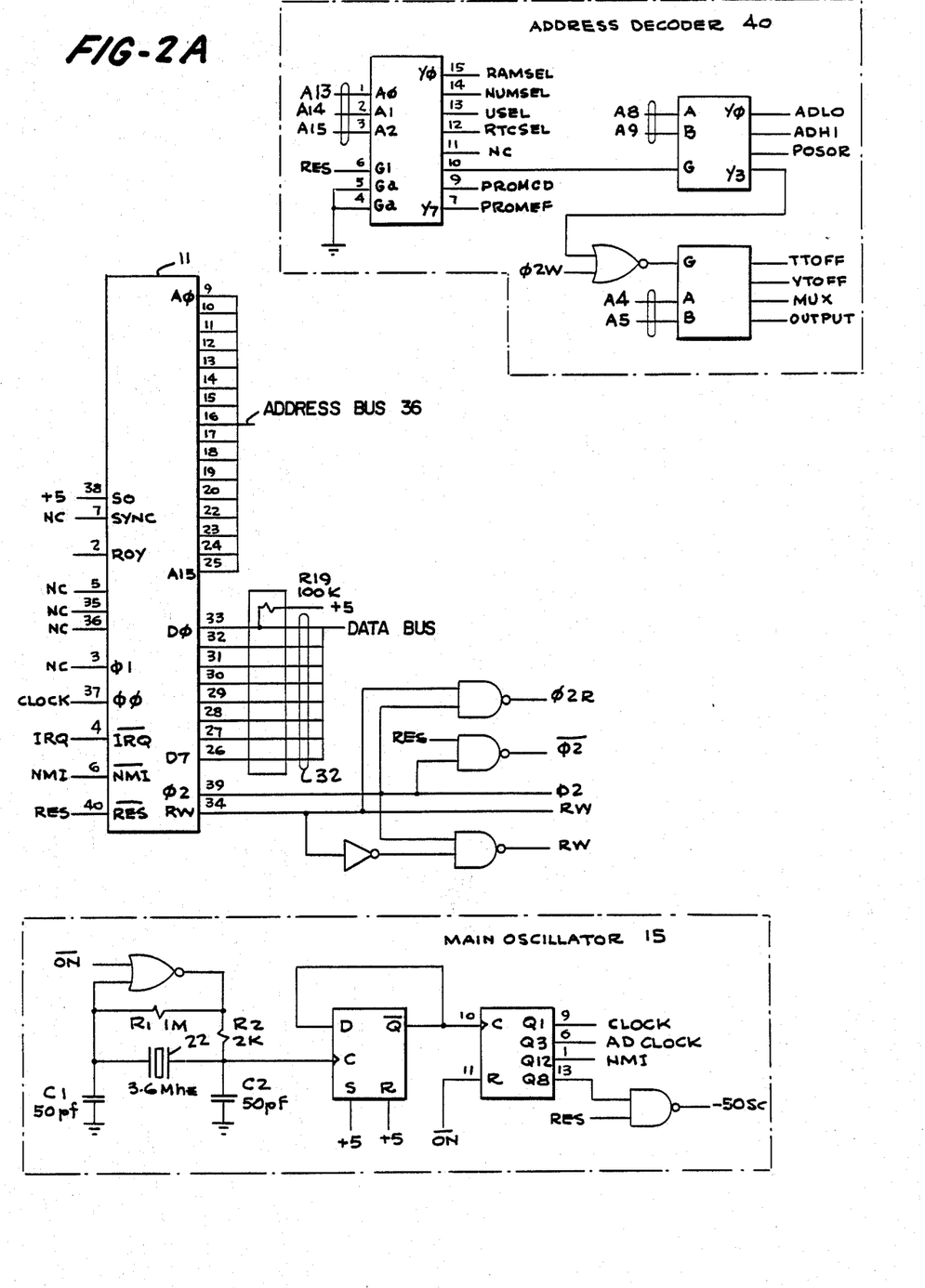
FIGS. 2A, 2B, 2C, 2D, 2E and 2F are detailed schematic diagrams of the circuit elements of the system as shown in FIG. 1.
Figure 2B:
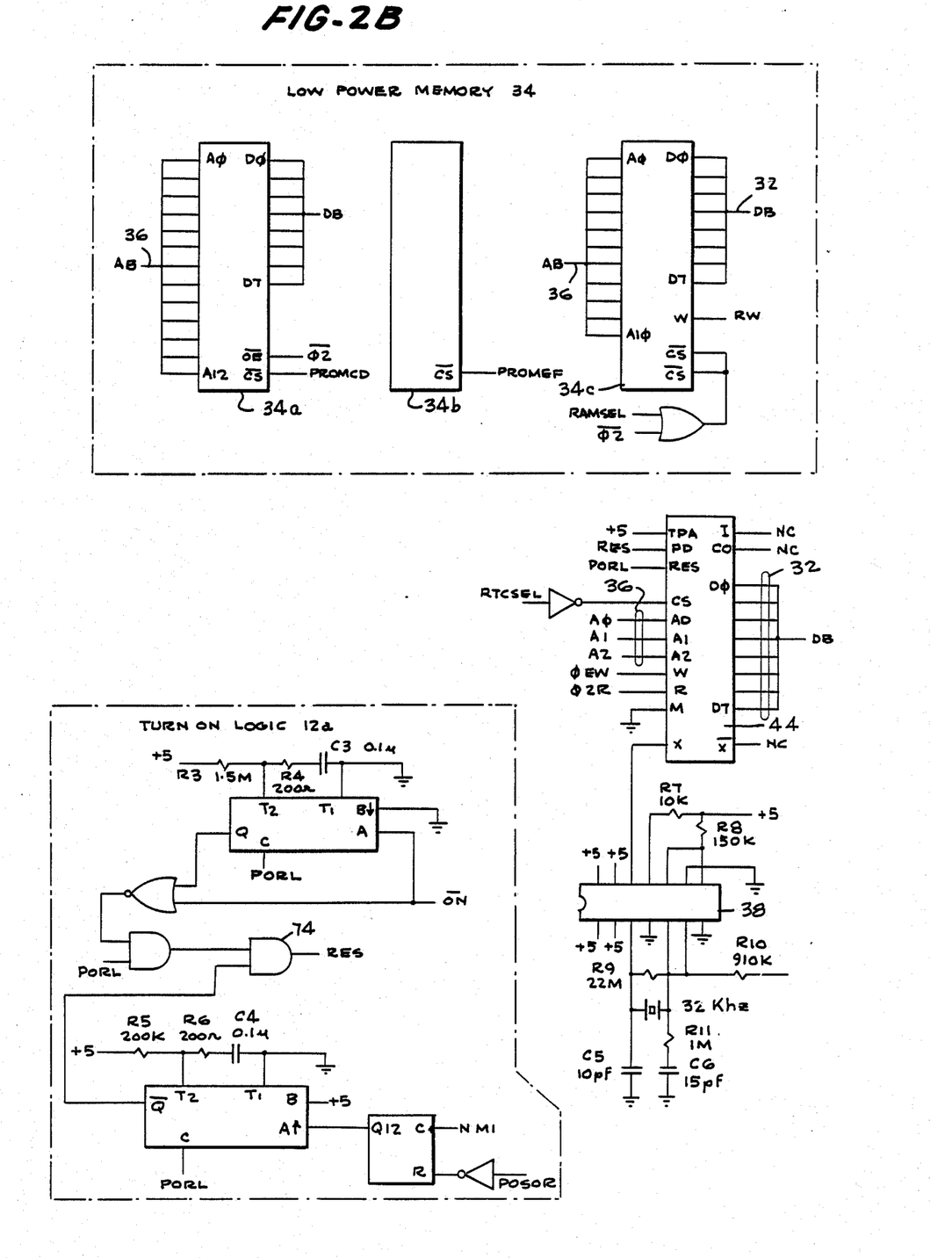

Referring now to FIGS. 2A to 2F, there is shown a detailed schematic of the elements comprising the corrected gas flow and measuring system 10. For the sake of clarity, many interconnections between the elements of the system 10 are not shown, but rather indicated by identifying the terminal(s) associated with one or more elements by the same designation, understanding that the interconnection couples those elements together. For example, the microprocessor 11, as shown in FIG. 2A, is interconnected by a data bus 32 from its outputs D0 to D7, to the turn-on logic 12b and to the low power memory 34, among other elements. In particular, the data bus 32 is coupled to a decoder 64 of the turn-on logic 12b and is coupled to the low power memory 34. The low power memory 34 comprises a pair of read-only-memories (ROM) 34a and 34b for storing the program, as will be explained with respect to FIG. 3, and a plurality of sets of coefficients used in the calculation of the supercompressibility factor $F_{pv}$, and a random-access-memory (RAM) 34c for providing short term storage of the measured variables and calculation variables. The non-volatile memory 18 stores a back-up set of the parameters used for volume calculation as stored in the RAM 34c. Further, the microprocessor 11 includes 16 address terminals A0 to A15, which are coupled by an address bus 36 to each of the ROM's 34a and 34b, and the RAM 34c of the low power memory 34 and to an address decoder 40, among other elements. In particular, selected lines of the address bus 36 are variously connected to selected of a plurality of decoders 66a, 66b and 66c that comprise the address decoder 40. The outputs of the decoders 66a, 66b and 66c generate a number of control signals that are applied throughout the system 10 to control data processing, output signals and transfer data between the elements of system 10. In a similar fashion, selected lines of the address bus 36 are coupled to inputs of a real time clock 44, which is coupled to receive the output of an oscillator 38, as shown in FIG. 2B.

Figure 2C:
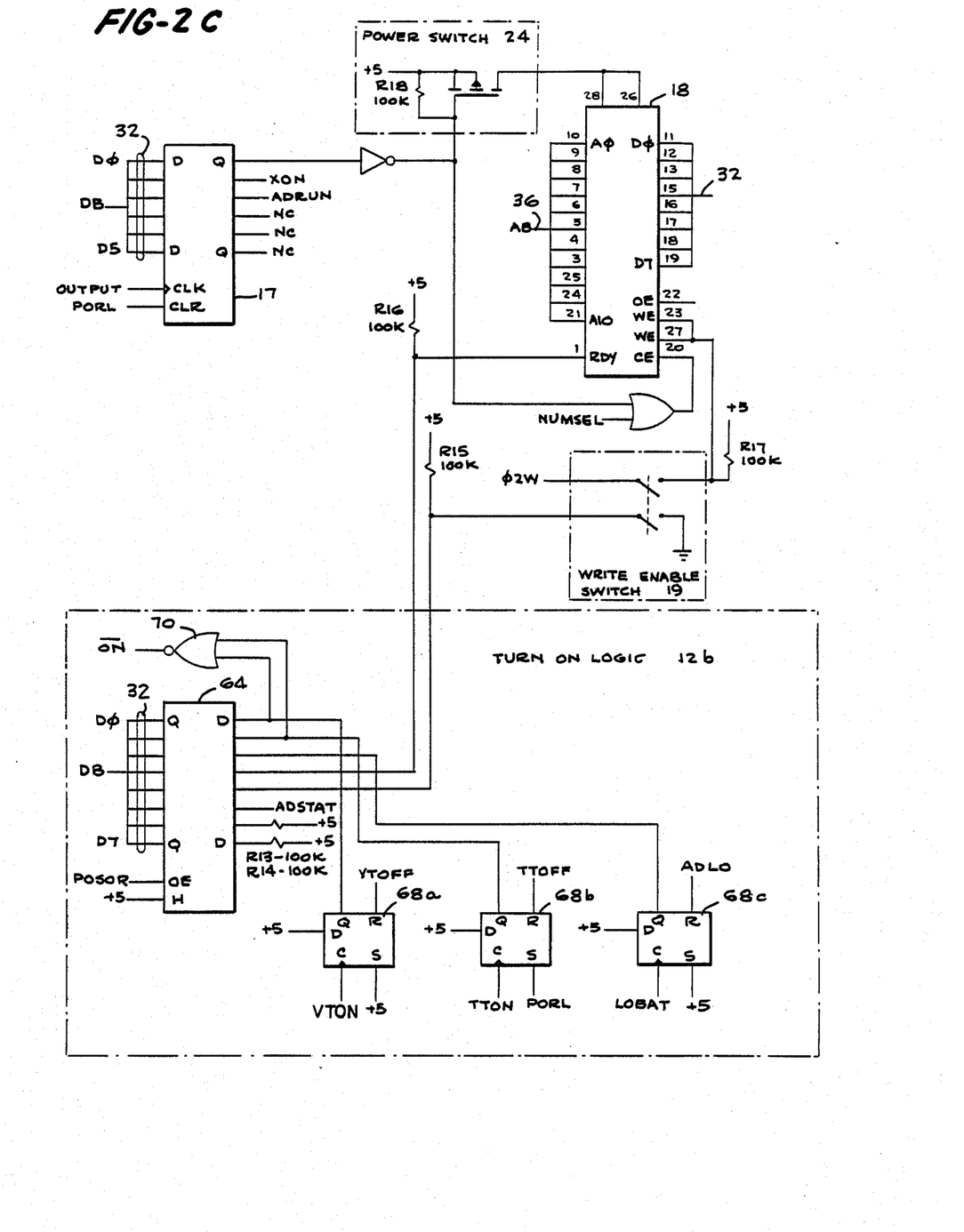

As shown in FIG. 2A and 2C, the microprocessor 11 is connected via the data bus 32 and a latch 17 to the power switch 24, which selectively energizes the high power, non-volatile memory 18. The memory 18 is also coupled by the address bus 36 and the data bus 32 to the microprocessor 11. The turn-on logic 12 is illustrated in FIG. 2A as being comprised of a number of elements generally grouped within the blocks 12a and 12b.

Figure 2D:
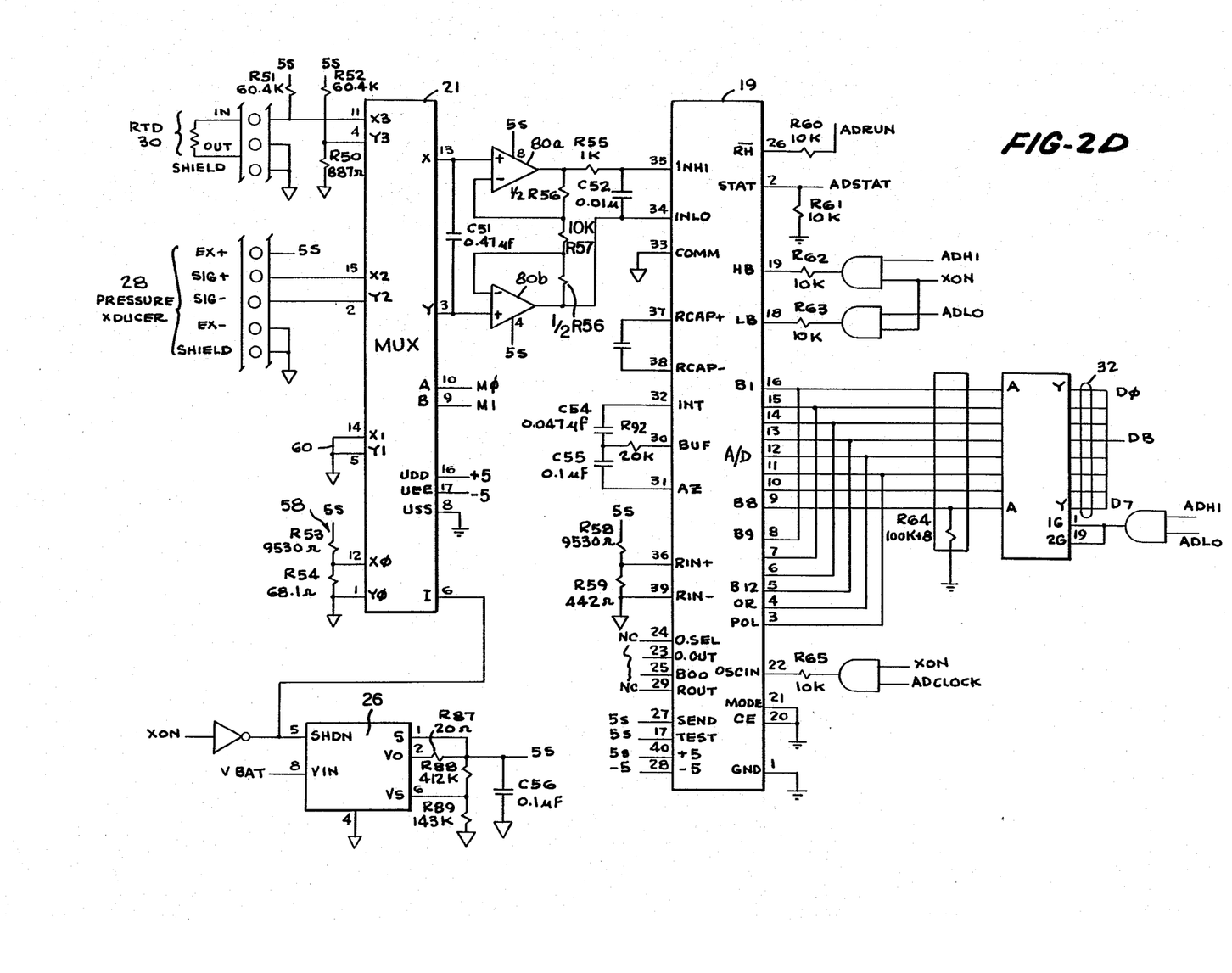
Figure 2E:
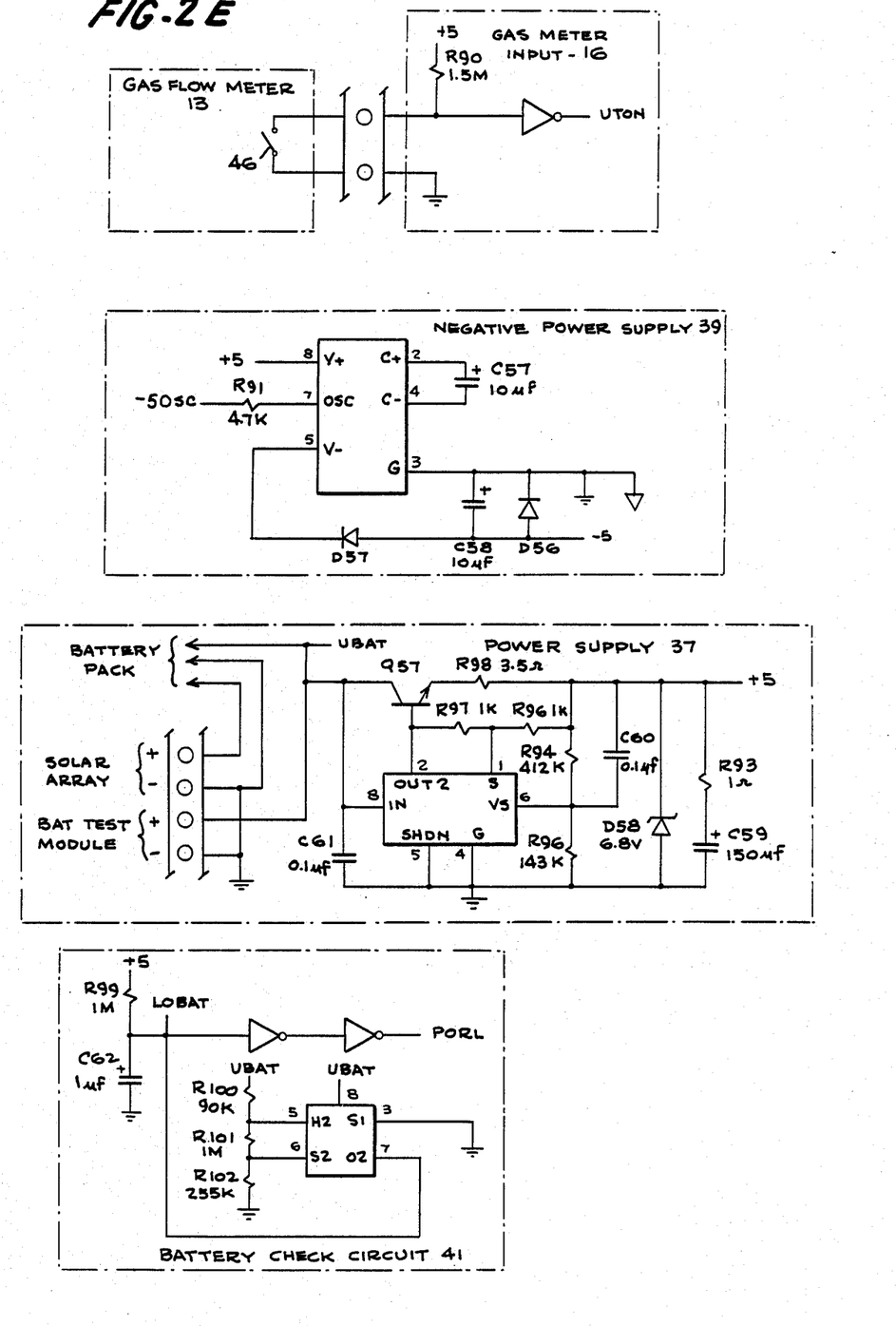

The gas flow meter 13, as generally shown in FIG. 1 and in detail in FIG. 2E, comprises a volume switch 46, which is closed in response to the passage of a unit of volume of the gas to be measured. The volume switch 46 is coupled by the gas meter input 16, which comprises a Schmitt Trigger 76, to supply a pulse-like signal VTON to the turn-on logic 12b and in particular, to the clock input C of the flip-flop 68a, as shown in FIG. 2C. In turn, the Q output of the flip-flop 68a goes high, and a corresponding output $\overline{ON}$ is generated by a NOR gate 70 and applied to a one-shot multi-vibrator 72 of the turn on logic 12a. The multi-vibrator 72 actuates an AND gate 74 after a suitable delay to generate and apply a signal to the interrupt terminal $\overline{RES}$ of the microprocessor 11, to initiate the next set of calculations of the supercompressibility factor $F_{pv}$ and the corrected gas flow. In effect, each closing of the volume switch 46 initiates execution of the program as will be explained with respect to FIG. 3.

A main oscillator 15 includes a crystal 22 for generating a 3.6 MHz signal, which is divided down and applied to the microprocessor 11 to time various events therein, and an ADCLOCK to the A/D converter 19 to time its operations. The $\overline{ON}$ signal is applied to the main oscillator 15 to initiate its operation.

A write-enable switch 19 is shown in FIG. 2C and, upon closing, permits writing of data into the non-volatile, high power memory 18. The write-enable switch 19 is thrown by the operator and is a protection mechanism to prevent undesired writing into the memory 18. The closing of the switch 19 sends a signal through the latch 64 of the turn-on logic 12b to the microprocessor 11 indicating that the switch 19 is closed. In turn, the microprocessor 11 causes a $\phi 2W$ signal to be generated, which is applied through switch 19 to the write-enable terminal WE of the non-volatile, high power memory 18, thus permitting data to be written therein.

Referring now to FIG. 2E, there is shown a power supply 37 coupled to a battery pack for providing a voltage, e.g., +5 volts, to the various elements of the system 10. A negative power supply 39 is provided, as shown in FIG. 2E, to provide a negative voltage to the analog input circuit 21 and the A/D converter 19, thus serving to actuate and energize these circuits. The battery pack is also connected to a voltage regulating switch 26, which when actuated by an XON signal applied a regulated, switched voltage 5S to the temperature and pressure measuring devices 30 and 28, the analog input circuit 21, a pair of operational amplifiers 80a and 80b, and the A/D converter 19. As will be explained later, it is not necessary that the switch 26 be of a relatively high precision and, thus, a costly piece of equipment, but may be of conventional design as may be secured at relatively low cost.

Figure 3:
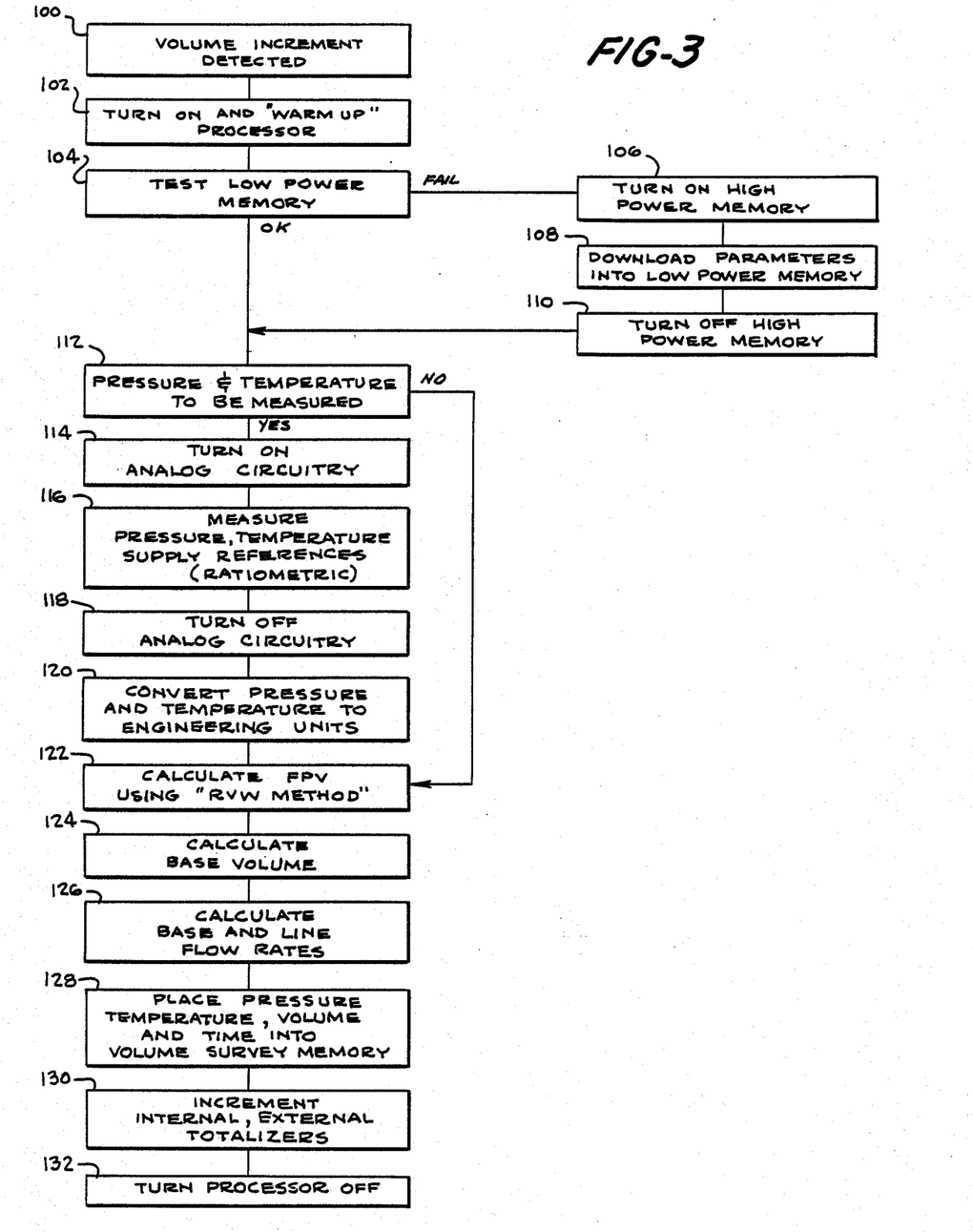
FIG. 3 is a high level flow diagram of the program as executed by the microprocessor incorporated in the system as shown in FIGS. 1, and 2A to 2F.

When the microprocessor 11 has completed executing the program, as shown in FIG. 3, it commands via the data bus 32 the address decoder 66, to cause decoder 66b to generate a signal VTOFF, which resets the flip-flop 68a of the turn-on logic 12b, thus causing the $\overline{ON}$ signal to go high. As a result, the main oscillator 15 is turned off and the CLOCK and ADCLOCK signals as applied respectively to the microprocessor 11 and the A/D converter 19, are turned off. Further, the −5 OSC signal is likewise deenergized and removed from the negative power supply 39, whereby the −5 volts is removed from the analog input circuit 21. Thus, after the program has been run to take measurements of flow temperature $T_f$ and flow pressure $P_f$, to calculate the supercompressibility factor $F_{pv}$ and to calculate the base gas volume $V_b$, power and clock signals are removed from the analog input circuit 21, the A/D converter 19 and the microprocessor 11, whereby these relatively high power consuming elements are disposed in a "sleep" mode, until the next unit volume of gas flows through the gas flow meter 13 and its volume switch 46 closes. The closing of the volume switch 46, as explained above, initiates the application of power and clock signals to the analog input circuit 21, the A/D converter 19 and the microprocessor 11 causing them once again to operate in their "run" mode. In this fashion, the power drained from the battery is reduced and its life extended.

A battery check circuit 41 monitors the output VBAT out of the battery and, if below a preset limit e.g., 6.4 volts, a turn-off signal PORL is generated. The PORL signal is applied to the turn on logic circuit 12a, which prohibits the microprocessor 11 from operating with less than an optimal battery condition.

As shown in FIG. 2D, the analog input circuit 21 takes the form of a multiplexer having four inputs; the first input to terminals X3 and Y3 is derived from the temperature measuring device 30, which assumes the form of a temperature sensitive resistor. The second input to terminals X2 and Y2 of the circuit 21 is taken from the pressure measuring device 28, which takes the form of a strain gauge-type device. The third input to terminals X1 and Y1 is connected to ground, whereby an offset voltage as would be indicative of that residual or error voltage as added onto the input signals applied to the other three inputs of the analog input circuit 21. A fourth input to terminals X0 and Y0 is coupled to a reference voltage divider 58 comprising series connected resistors R53 and R54, which couple the voltage 5S to ground; the resistors R53 and R54 are temperature stable resistors, whose impedance is stable over at least the extended ambient temperature range of interest, e.g., −40° to +160° F. The resistances of the resistors R53 and R54 do vary slightly with temperature, but are deemed temperature stable relative to the devices 28 and 30, whose impedances vary greatly with temperature. The analog input circuit 21 is controlled by a pair of signals M0 and M1 to control which of the four inputs is applied to the input circuit's output X and Y.

The output of the analog input circuit 21 is in turn connected via the pair of operational amplifiers 80a and 80b to the inputs INHI and INLO of the A/D converter 19. In a fashion similar to that of the analog input circuit 21, a reference voltage divider 62 comprised of series connected reference resistors R58 and R59, is connected to the inputs RIN+ and RIN− of the A/D converter 19, whereby a comparison of a reference voltage developed across a reference resistor R59 of the voltage divider 62 may be made with the output of the analog input circuit 21 to provide a digital signal indicative of the analog input circuit's output. The A/D converter 19 is coupled by the data bus 32 to the microprocessor 11 and is commanded by an ADRUN signal from the microprocessor 11 to effect an A/D conversion; thereafter, the A/D converter 19 applies an ADSTAT signal to the microprocessor 11, indicating the completion of the commanded A/D conversion. In particular, the microprocessor 11 executes the program, as shown in FIG. 3, to send a command signal via the data bus 32 to the latch 17 to first generate the enabling signal XON, which in turn actuates the switch 26, thereby energizing the pressure and temperature measuring devices 28 and 30, the analog input circuit 21 and the A/D converter 19. In particular, the enabling signal XON is applied via an inverter to the power switch 26, as shown in FIGS. 2C and 2D. The power switch 26 not only functions as a switch but as a voltage regulator to apply a regulated reference voltage 5S, upon being actuated by the enabling signal XON, to the devices 28 and 30, the analog input circuit 21 and the A/D converter 19. Next, the microprocessor 11 transmits a command signal via the data bus 32 to the latch 17, to generate the ADRUN signal as applied to the A/D converter 19, thus actuating the A/D converter 19 to convert the input analog signal to a corresponding digital signal. Upon completion of the A/D conversion, the A/D converter 19 generates the ADSTAT signal, which is applied via the latch 64 and the data bus 32 to inform the microprocessor 11 of the completion of the A/D conversion. The inverted XON signal is also applied to the I input of the analog input circuit 21, enabling this circuit.

Figure 2F:
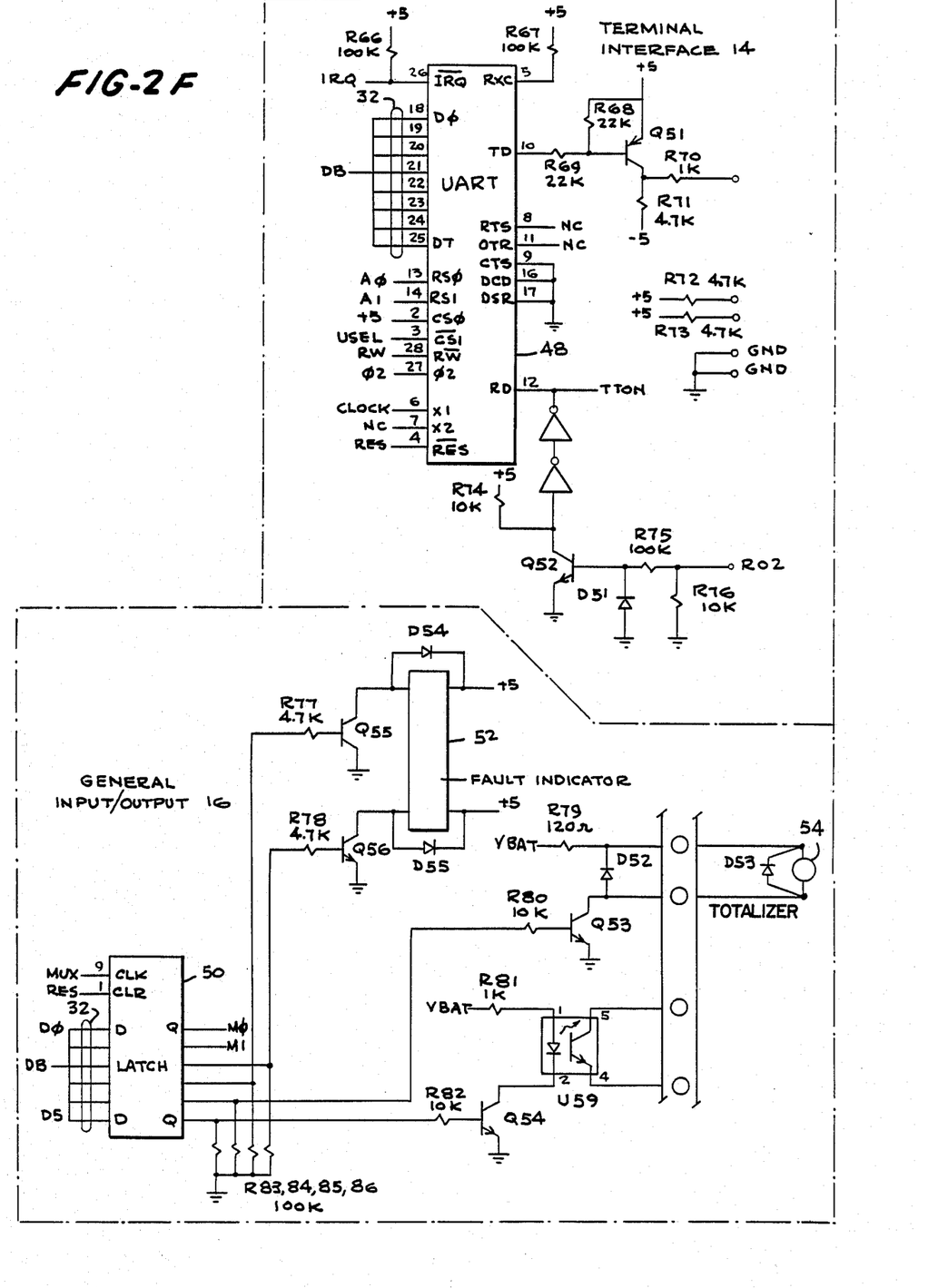

The details of the terminal interface 14 are shown in FIG. 2F. The microprocessor 11 is connected to a UART 48 via the data bus 32, which in turn supplies a series of outputs to the portable recorder 27, as shown in FIG. 1. The portable terminal 27 includes a keyboard and a suitable display, whereby the operator may enter various constants to be used in the calculations performed by the program. The terminal 27 is illustratively an RS-232 compatible terminal.

The general input/output 16 includes a latch 50 coupled to the data bus 32 to receive input signals, to a fault indicator 52 and to the mechanical counter or totalizer 54, whereby a total or accumulated indication of corrected volume may be provided. The microprocessor 11 transmits a command via the data bus 32 to the latch 50, which outputs the command signals M0 and M1, whereby the analog input circuit 21 is commanded to select one of its four inputs to be applied to the A/D converter 19. The fault indicator 52 provides a visual indication to the operator that the pressure and temperature measuring devices 28 and 30 are operating out of range, that the constants stored in the non-volatile, high power memory 18 have been lost, that the battery is low, and other malfunctions of the system 10.

FIG. 3 is a high level flow diagram of the program stored in the ROM's 34a and 34b of the low power memory 34, as shown in FIG. 2B, and executed by the microprocessor 11 for accumulating the pulses of the gas flow meter 13, for taking samples of flow temperature $T_f$ and flow pressure $P_f$ and for calculating an indication or manifestation indicative of gas flow corrected to base temperature Tb and pressure $P_b$. Initially, step 100 responds to the measurement by the gas flow meter 13 of a unit volume of gas flow, and, in particular, to the closing of the volume switch 46 as shown in FIG. 2E to generate a VTON signal as applied to the turn-on logic 12a, which in turn applies after an appropriate delay provided by the one-shot multi-vibrator 72 an $\overline{\text{RES}}$ signal to the microprocessor 11, whereby the following steps 102 to 132 are executed as will be explained with respect to FIG. 3. The closing of the volume switch 46 initiates the execution of the program by the microprocessor 11. In that period between the completion of the execution of the program and its next execution, the corrected gas flow measuring system 10 is disposed in its "sleep" mode, wherein relatively little current is drawn from the battery. On the closing of the volume switch 46, the system 10 is operated in its "run" mode, wherein samples of flow temperature $T_f$ and pressure $P_f$ are taken, these analog samples are converted into digital form, and calculations of the supercompressibility factor $F_{pv}$ and the base gas volume $V_b$ are made. In the "run" mode, the system draws increased power from the battery for that limited period of time corresponding to the execution o the program. Upon completing the execution of the program, the system returns to its "sleep" mode.

Next, step 102 provides a warm-up period before step 104 tests the low power memory 34 and, in particular, the RAM 34c, which stores the constants and coefficients to be used subsequently in calculations of the supercompressiblity factor $F_{pv}$ and base gas flow $V_b$. Each gas or mixture of gases to be measured has a particular set of constants, which are stored within the RAM 34c. Once a particular mixture of gas is determined to be measured and the corresponding set of calculation variables is stored within the RAM 34c, the values of the stored calculation variables are summed in an initialization or calibration procedure and that sum is stored in a known location within the RAM 34c and the non-volatile, high power memory 18. In order to ensure the integrity of the calculation variables as stored within the RAM 34c step 104 executes a CHECK SUM subroutine, whereby the coefficients and constants as stored within the RAM 34c are again summed and the sum compared with the previous sum as stored in the known location. The CHECK SUM subroutine searches for the first in a sequence of locations where the constants and coefficients are stored, and repeatedly addresses each of the sequence of these locations adding that value to the previously summed value until the last known address is accessed.

At that point, the current sum is compared with the previously obtained sum and if there is a match, indicating the integrity of the RAM 34c, the program continues with step 112, wherein the flow temperature $T_f$ and flow pressure $P_f$ may be sampled. Otherwise, as shown in FIG. 3, the program moves to step 106, which effects an energization of the relatively high power, non-voltage memory 18 and, thereafter, a downloading of a backup set of the calculation variables from the memory 18 to the RAM 34c. Initially, the power switch 24 is closed, whereby an energizing voltage is applied to the non-volatile memory 18; thereafter, the CHECK SUM subroutine is again run on the contents of the non-volatile memory 18, i.e., each location, where the calculation variables are stored, is sequentially summed until the last storage location within the memory 18 is accessed; the final sum is then compared with the predetermined sum and if there is an agreement, indicating the integrity of the set of calculation variables stored within the non-volatile, high power memory 18, the backup set of calculation variables is downloaded into the RAM 34c. If the sum of the calculation variables within the non-volatile, high power memory 18 does not agree with the predetermined sum, the program moves to its standard turn-off procedure, whereby the system 10 is disposed in its "sleep" mode. If the CHECK SUM subroutine fails to indicate that the contents of the memory 18 are intact, the microprocessor 11 commands via the data bus 32 and the latch 50 for the fault indicator 52 to provide a visual manifestation of such failure.

After the backup set of calculation variables has been downloaded in step 108 from the non-volatile, high power memory 18 to the RAM 34c, a further CHECK SUM subroutine is executed on the newly entered contents of the RAM 34c. If the obtained sum agrees with the predetermined sum, step 110 opens the power switch 24, whereby the non-volatile, high power memory 18 is deenergized, and the program continues with step 112. However, if either the second CHECK SUM subroutine check of the non-volatile, high power memory 18 or the CHECK SUM subroutine check of the RAM 34c after the backup set of constants and coefficients have been downloaded to the RAM 34c fails, then the system 10 goes into its "sleep" mode, wherein non-volatile memory 18, the A/D converter 19, the analog input circuit 21 and the pressure and temperature measuring devices 28 and 30 are deenergized, and further the fault indicator 52 is energized to provide an alarm manifestation indicative of system shutdown.

Next, step 112 determines whether the sample outputs of the pressure and temperature measuring devices 28 and 30 are to be used and, if so, the program moves to step 114. If the devices 28 and/or 30 are not to be used, the program moves to step 122, wherein the supercompressibility factor $F_{pv}$ is calculated using previously entered values of flow pressure $P_f$ and/or temperature $T_f$. One or both of the devices 28 and 30 may have failed and the programming of step 112 permits the system to still be used. Further, the system 10 may be employed where the pressure and/or temperature may be known to be relative constant values and therefore need not be measured. If the pressure and temperature measuring devices 28 and 30 are used, step 114 actuates the power switch 26, applying the switched voltage 5S to the A/D converter 19 and the analog input circuit 21. The microprocessor 11 applies its M0 and M1 signals to command the analog input circuit 21 to sequentially sample its X3-Y3 input to obtain an indication of the flow temperature $T_f$, its X2-Y2 input to obtain a value of line pressure $P_f$, its X1-Y1 input to obtain the offset voltage appearing at ground and, finally, its X0-Y0 terminal to sample the reference voltage appearing across resistor R54 of the reference voltage divider 58. At each sampling, the analog values as derived from the analog input circuit 21 are applied to the A/D converter 19 to derive corresponding, digital samples or counts indicative of flow temperature $T_f$, flow pressure $P_f$, the offset voltage and a temperature independent reference voltage.

The integrity of these samples is double checked in a number of ways. First the level of the switched voltage 5S is checked to determine whether it is overrange and of the correct polarity. In addition, the operation of the A/D converter 19 is checked by measuring the time of conversion and if the A/D conversion has taken too long, there is indication of the faulty operation of the A/D converter 19. If either the voltage level of the switched voltage 5S is not within predefined limits or the A/D conversion takes too long, predetermined values of pressure and temperature, e.g., 0 pounds per square inch and 60° F., are used in the subsequent calculations of the supercompressibility factor $F_{pv}$.

Thereafter, step 118 opens the power switch 26, whereby the voltage provided by the switch 26 is removed from the A/D converter 19. By energizing the A/D converter 19 and the analog input circuit 21 for limited periods of time, the battery drainage is minimized and battery life extended. The measurements of pressure, temperature and reference voltage as obtained in step 118 are processed in step 120 to compare or interpolate these measurements of temperature and pressure with initially derived, calibrated values of temperature and pressure taken at predetermined, calibration conditions. The interpolation procedure provides accurate measurements of pressure and temperature that substantially eliminates any errors caused by variations in the level of the output voltage of the switch 26. Such variation or fluctuation occurs often as temperature varies. In particular, the outputs of step 120 are digital signals or counts indicative of flow pressure $P_f$ either in lbs./in.$^2$ or kilo pascals (a metric measurement of pressure) or of flow temperature $T_f$ either in degrees centigrade or Fahrenheit.

Before the system 10 is run to execute the program shown in FIG. 3, an initial calibration procedure is carried out to obtain ratios of a temperature count to reference voltage count at two predetermined calibration temperatures. Typically, if the system is to be used in a temperature range of 32° to 70° F, the calibration temperatures are selected to be 32° and 70° F., and corresponding count ratios are obtained, as will now be discussed. First, the temperature transducer 30 is disposed at the relatively low calibration temperature, e.g., 32° F., which is precisely measured by any of well known, precision temperature measuring devices. The operator enters the measured temperature through the portable terminal 27 and the terminal interface 14 to the microprocessor 11, which then commands the A/D converter 19 to obtain analog signals from the temperature measuring device 30 and the voltage reference divider 58, and to provide corresponding digital signals or counts; the ratio of these two counts is stored in the high power, known volatile memory 18 and the RAM 34c, along with the operator input value of the corresponding, measured low calibration temperature. A similar ratio of the output of the temperature measuring device and the voltage reference divider 58 and an operator input value of the corresponding temperature is obtained at the higher calibration temperature, e.g., 70° F. At the end of the temperature calibration procedure, there are two pairs of ratios stored in the high power, non-volatile memory 18 and the RAM 34c. A similar calibration procedure is carried out for the pressure measuring device 28, whereby the ratios of the low and high pressure counts to the reference voltage counts are stored in the memory 18 and the RAM 34c, along with operator input values of calibration pressure as precisely measured by the operator. Illustratively, the low and high calibration pressures are 0 and 100 lbs./in.$^2$. The calibration temperature and pressure ratios are thus obtained during the calibration procedure and are stored in the high power, non-volatile memory 18 and the RAM 34c for later use in step 120.

Returning now to a consideration of the program shown in FIG. 3, step 118 deactivates the switch 26, thus removing the switched voltage 5S from the analog input circuit 21 and the A/D converter 19. Then, step 120 takes the current counts indicative of the measured flow temperature $T_f$ and pressure $P_f$, and the reference voltage level from the A/D converter 19 and, first, forms ratios of pressure to reference voltage and temperature to reference voltage, before interpolating these count ratios with respect to the calibration ratios of pressure and temperature obtained in the manner described above. The details of the step or subroutine 120 to obtain a precise value of pressure will now be explained. First, a sample output $P_f$ of the pressure measuring device 28 is obtained and is converted by the A/D converter 19 to a corresponding digital value or count. A check is made to determine whether the A/D converter 19 has operated improperly, i.e., has the A/D conversion taken too long, and, if not, the digital output of the A/D converter 19 is converted into an appropriate numerical form that can be operated on by the program executed by the microprocessor 11. Then the polarity and magnitude of the pressure count are checked. If correct, a count corresponding to the offset voltage is subtracted from each of the pressure count, the temperature count and the reference count. Then a ratio of the count corresponding to the pressure measurement less voltage offset, to the voltage reference level is obtained. Then, the difference between the presently measured pressure and the low calibration pressure is obtained, before the difference between the high and low calibration pressures, i.e., the pressure range, is obtained. Next, the fraction of present pressure to the pressure range is obtained as the ratio of the difference between the current pressure and the low calibration pressure, to the pressure range. Next, that fraction is multiplied times the pressure range and, then, added to the low calibration pressure to provide an interpolated, highly accurate measurement of the value of pressure that is independent of the level of the switched voltage 5S of the switch 26 and is substantially independent of the differences from one system 10 to the next. Subroutine 120 also operates on the sampled output of the temperature measuring device 30 to obtain similar ratios of temperature $T_f$ to reference voltage, and then, subsequently interpolates that present temperature ratio between two calibration ratios obtained at the low and high calibration temperatures, to provide a precise value of temperature that is substantially independent of the output level of the switched voltage 5S from switch 26.

Next, step 122 calculates the supercompressibility factor $F_{pv}$. The AGA NX-19 procedure for calculating the supercompressibility factor $F_{pv}$ is a lengthly series of equations (see equations 3 to 15, set out above) that use fractional exponentiation and covers pressure and temperature ranges of 0 to 5000 psig and $-40°$ to $+240°$ F., respectively. These equations are used to generate a table by sectioning the P-T range into eight smaller regions. Observation of equation (15) above indicates that fractional exponentiation, i.e., the calculation of 2.3, requires a lengthly program requiring extended time for a microprocessor to execute. In accordance with the teachings of this invention, a least squares curve-fitting routine was developed to fit the supercompressibility factor $F_{pv}$ generated by the AGA NX-19 procedure to provide the following 9-coefficient, equation:

$$F_{pv} = A + Bx + Cy^2 + Dy + Ey^3 + Exy + Gxy^2 + Hxy^3 + Ix^2 \quad (16)$$

where:

$$K_T = M_c + 1.681 M_n \quad (17)$$

$$F_T = \frac{226.29}{99.15 + 211.9\, SG - K_T} \quad (18)$$

$$T_{adj} = ((T_f + 460)\, F_T) - 460 \quad (19)$$
$$K_p = M_c - .392 M_n \quad (20)$$

$$F_p = \frac{156.47}{160.8 - 7.22\, SG + K_p} \quad (21)$$

$$P_{adj} = P_f \cdot F_p \quad (22)$$
$$y = P_{adj} \quad (23)$$

$$x = \frac{1}{T_{adj} + 70}, \quad (24)$$

where A to I are the equation coefficients as discussed above, $K_p$ is a diluent pressure constant, $F_p$ is a pressure adjusting factor, $P_{adj}$ is the adjusted pressure in psig, $K_t$ is the diluent temperature constant, $F_t$ is the pressure adjusting factor, $T_{adj}$ is the adjusted temperature in degrees Fahrenheit, and SG is the specific gravity of the flowing gas. The measured values of flowing pressure $P_f$ and flowing temperature $T_f$ are inserted into equations (19) and (22), and the subroutine 122 effects a series of calculations starting first with equation (17) and continuing in sequence to equation (24), until the values of x and y are derived and inserted into equation (16). The values of mol % of carbon dioxide Mc and mole % of nitrogen Mn, and specific gravity SG are stored in the non-volatile memory 18 and the RAM 34c and are entered into the equations (17), (18), (20) and (21) as noted above.

Figure 4:
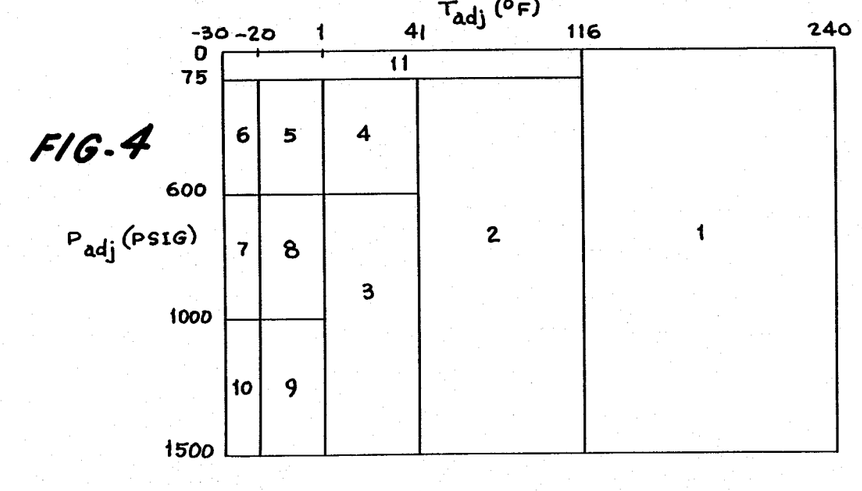
FIG. 4 is a chart showing the 11 regions determined in accordance with measurements of temperature and pressure, for selecting one of a corresponding 11 sets of coefficients to be used in the calculation of the supercompressibility factor $F_{pv}$ by the microprocessor incorporated in the system as shown in FIGS. 1, 2A through 2F.
Figure 5:
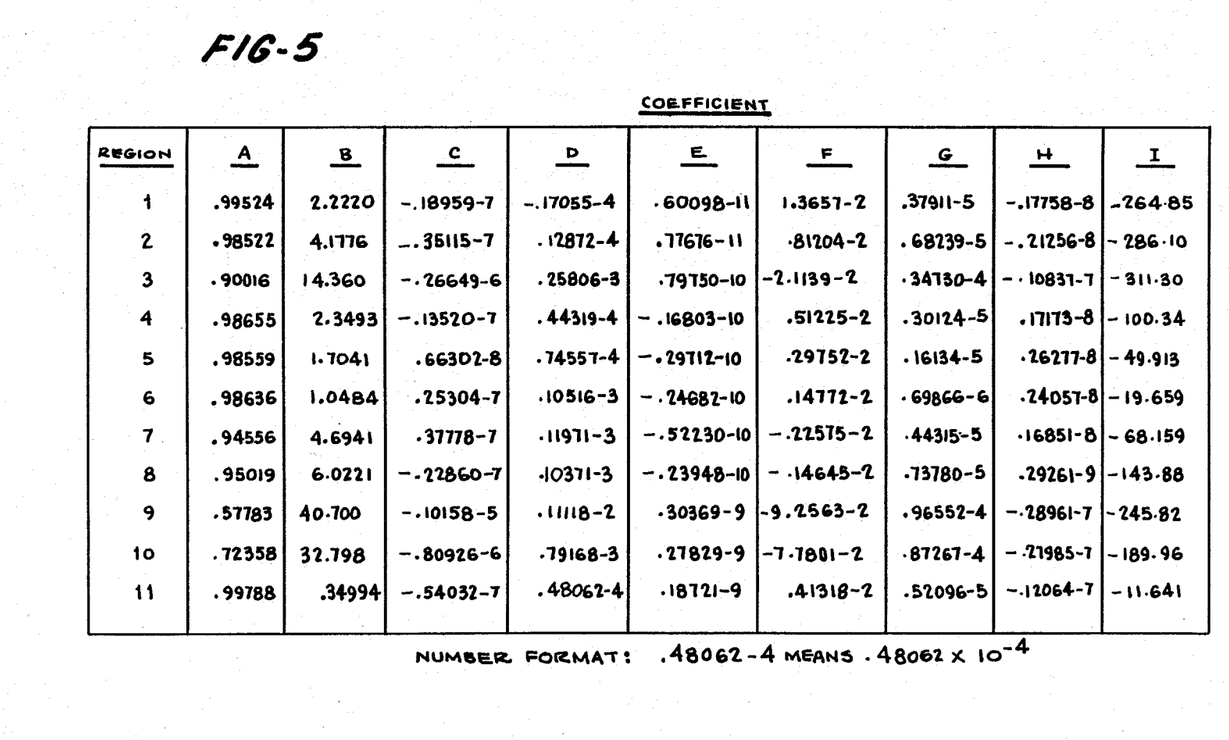
FIG. 5 is a chart of the 11 sets of coefficients, one set of which is selected in accordance with the chart of FIG. 4.

One equation could not fit the entire pressure and temperature range for the calculations of the supercompressibility factor $F_{pv}$. As a result, the pressure and temperature range was divided into 11 regions, as shown in FIG. 4, each of the 11 regions defining a set of A to I coefficients as shown in FIG. 5. Referring to FIG. 4, region 1 includes values of adjusted temperature $T_{adj}$ of 116° to 240° F., and adjusted pressure in the range of 0 to 1500 psig. If the values of $T_{adj}$ and $P_{adj}$ as calculated by equations (19) and (22), respectively, fall within those ranges, the coefficients A to I of region 1 are accessed as stored in the ROM's 34a and 34b and that set is entered into equation (16), and the supercompressibility factor $F_{pv}$ is calculated. In particular, the subroutine 122 compares the calculated values of $T_{adj}$ and $P_{adj}$ with a sequence of sets of limits, whereby through a process of elimination, the corresponding one region is determined. For example, if the value of adjusted temperature $T_{adj}$ is greater than 116, the first region is determined and that set of coefficients is taken from the table reproduced above and inserted into the above equation (16). However, if the adjusted pressure $T_{adj}$ is less than 116° F. and the adjusted pressure $P_{adj}$ is less than 75 psig, region 11 is determined. In a similar fashion, each of the remaining regions is determined by this logical process of elimination.

The sets of coefficients A to I for expression (16) and the constant terms of the expressions (17 to 24) are stored in the ROMs 34a and 34b. The particular values of base temperature Tb, base pressure Pb, the calibration temperatures and pressures, and the mol %'s of the gas constituents for a particular situation, are entered by the portable terminal 27 to be stored in the RAM 34c. The corresponding calibration ratios are calculated by the microprocessor 11 and then stored in the RAM 34c. As explained above, a back-up set of these calculation variables is also stored in the non-volatile memory 18.

In order to check the accuracy of the values of the supercompressibility factor $F_{pv}$ as obtained from the least squares fitted expression 16, reproduced above, with those values obtained from the AGA NX-19 procedure, a computer program was written to effect calculations of values by both procedures, at every 0.5 psig and 0.5° F. over a range of adjusted temperature of $-30°$ to 240° F. and adjusted pressure of 0 to 1500 psig. The maximum error between these two procedures was 0.06%.

Next, step 124 inserts the value of the supercompressibility factor $F_{pv}$ calculated in step 122, into the following equation to calculate base volume $V_b$ from line volume $V_f$ corrected for conditions of base pressure $P_b$ and temperature $T_b$:

$$V_b = (V_f) \frac{P_f + P_a}{P_b} \frac{T_b}{T_f} (F_{pv})^2 \quad (25)$$

The number of pulses from the gas flow meter 13 is accumulated to provide an indiction of measured uncorrected gas volume $V_f$. In order to distribute and sell natural gas, it is necessary to agree upon the base conditions including base pressure $P_b$ and base temperature $T_b$. Further, the line and base gas flow rates are calculated using the calculations of measured and base volume along with time from the real time clock 44.

Next, step 128 stores measured values of pressure, temperature and volume as a function of time into a volume survey memory as stored in RAM 34c. The microprocessor 11 responds to the indication of real time as provided by the real time clock 44, to periodically store measurements of pressure, temperature and volume for each regular period of time, e.g., daily or hourly. Thereafter, the microprocessor 11 transmits a command via the data bus 32 to increment the mechanical counter or totalizer 54 and an external totalizer as coupled to the general input/output 16, as shown in FIG. 2F. Thereafter, step 132 turns off the system 10, deenergizing the main oscillator 15, thus removing the CLOCK and ADCLOCK signals from and disposing the microprocessor 11 into a low power state, to wait for the next pulse received from the gas flow meter 13, i.e., the system 10 is returned to its "sleep" mode. In this fashion, the system 10 is only disposed briefly in its "run" mode, wherein samples of pressure and temperature are taken and calculations of the supercompressibility factor $F_{pv}$ and corrected gas flow are calculated, to minimize battery drainage and increase battery life.

In considering this invention, it should be remembered that the present disclosure is illustrative only and the scope of the invention should be determined solely by the appended claims.

We claim as our invention:

1. A process of measuring a variable in a range between first and second values thereof employing a voltage dependent element whose impedance varies as a function of the measured variable for providing a manifestation indicative of the measured variable, said process comprising the steps of:
  (a) applying a voltage to said variable measuring element and a reference element, whose impedance is relatively stable;
  (b) exposing said variable measuring element to said first value of said variable, and deriving from said variable measuring element and said reference element corresponding first and second signals;
  (c) exposing said variable measuring element to said second value of said variable, and deriving from said variable measuring element and said reference element corresponding third and fourth signals;
  (d) obtaining a first calibration ratio of said first to said second signals and a second calibration ratio of said third to said fourth signals;
  (e) exposing said variable measuring element to an unknown variable and deriving from said variable measuring element and said reference element corresponding fifth and sixth signals a fluctuating voltage being applied commonly to said variable measuring element and said reference element;
  (f) deriving a present ratio of said fifth to sixth signals;
  (g) interpolating said present ratio with respect to said first and second calibration ratios to provide said manifestation of the measured variable substantially free of any fluctuation of the level of said voltage.

2. The process of measuring said variable as claimed in claim 2, wherein said step of interpolating includes obtaining a first difference between said present ratio and one of said first and second calibration ratios, obtaining a fraction as the quotient of said first difference to second difference between said first and second calibration ratios, and obtaining said manifestation of said measured variable as the product of said fraction and a third difference between said first and second values of said variable.

3. The process of measuring said variable as claimed in claim 2, wherein said one calibration ratio is obtained for a corresponding one of said first and second values of said variable, and said step of interpolating further includes the step of summing said product to said one variable to obtain said manifestation of said measured variable.

4. The process for measuring said variable as claimed in claim 1, wherein said variable is temperature and said impedance of said element varies as a function of temperature.

5. The process for measuring said variable as claimed in claim 1, wherein said variable is pressure and said impedance of said element varies as a function of pressure.

6. Apparatus for measuring a variable in a range between first and second values thereof, comprising:
  (a) a variable measuring element having an impedance which varies as a function of said variable;
  (b) a reference element whose impedance is relatively stable with respect to that of said variable measuring element;
  (c) means for applying a voltage to each of said variable measuring element and said reference element;
  (d) calibration means for deriving from said variable measuring element and said reference element first and second signals respectively when said variable measuring element is exposed to said first value of said variable, and third and fourth signals respectively when said variable measuring device is exposed to said second value of said variable, and for obtaining a first calibration ratio of said first to said second signals and a second calibration ratio of said third to the fourth signals; and
  (e) control means including measuring means for deriving fifth and sixth signals respectively from said variable measuring elements and said reference element when said variable measuring element is exposed to a present variable to be measured and for obtaining a present ratio of said fifth to said sixth signals, and interpolation means for interplating said present ratio with respect to said first and second calibration ratios to provide a manifestation of said variable free of variations in the level of said voltage.

7. The process for measuring said variable as claimed in claim 1, wherein said reference element is stable at least in a range between said first and second values of said variable.

* * * * *